UNITED STATES PATENT OFFICE.

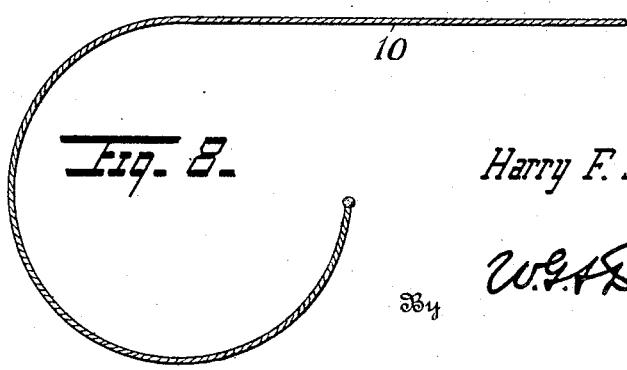

HARRY F. SHINDEL, OF GLENSIDE, PENNSYLVANIA, ASSIGNOR TO T. A. WILLSON & CO., INC., OF READING, PENNSYLVANIA, A CORPORATION OF PENNSYLVANIA.

SPECTACLE-TEMPLE.

1,266,067.  Specification of Letters Patent.  Patented May 14, 1918.

Application filed February 8, 1917. Serial No. 147,284.

*To all whom it may concern:*

Be it known that I, HARRY F. SHINDEL, a citizen of the United States, residing at Glenside, in the county of Berks and State of Pennsylvania, have invented certain new and useful Improvements in Spectacle-Temples, of which the following is a specification.

My invention consists in the improved spectacle temple hereinafter fully described in connection with the accompanying drawings; the same comprising separately formed shaft, pivot-piece, and inclosing-sleeve parts which are conveniently assembled and rigidly united to form a neat and inexpensive device, the novel features of which are clearly defined in the subjoined claims.

Figure 1 is a longitudinal view of a complete temple embodying my invention; Fig. 2 is an enlarged sectional view of its pivot-end portion; and Figs. 3 to 8 inclusive illustrate in preferred form the separate parts which are rigidly united to form the improved temple.

The temple wire or shaft 10 is preferably of the well known cable type as indicated, cut to required length. The separately formed pivot piece, as shown in Figs. 5, 6, and 7, is preferably stamped from sheet metal and comprises a shank portion 11, and a pivot-eye end portion 12 forming an off-set 13 at its junction with the shaft.

In my improved temple the shaft 10 and pivot end-piece 11—12, are arranged with the shank portion 11 of the latter in abutting alinement with the shaft; and are rigidly united by a separately formed tubular sleeve 15 inclosing said shank and an adjacent portion of the shaft so as to form a neat and positive reinforcing union of the parts, the material of the latter being subjected to swaging action whereby such union is effected.

The sleeve 15 is preferably formed from a piece of sheet metal, as indicated in Fig. 3; said piece being folded up, as indicated in Fig. 4, into straight tubular form with its longitudinal edges 16, 16 abutting; and radial recesses or apertures being provided in the walls thereof, as indicated at 17, 17ª, to engage the inclosed material when subjected to the uniting swaging action.

The sleeve is adapted to receive both the end portion of the temple shaft 10, and the shank portion 11 of the pivot piece, so as to conveniently assemble the parts snugly for the uniting operation; such assembling being facilitated by the elasticity of the preferred folded-up structure of the sleeve, and also by a slight bending of the shank 11, as indicated in Fig. 7, which bend insures proper holding of the shank in the sleeve preliminary to permanently uniting the parts by swaging action. A transverse slot 18 is preferably provided at one end of the sleeve, to engage the pivot piece with the off-set 13 abutting against the end of the slot as shown. The longitudinal edges 16, 16 of the sleeve may be folded into abutting relation before or after the assembling of the parts.

The assembled parts are readily presented to a swaging tool or form whereby they are jointly subjected to shaping pressure which is applied directly to the sleeve so as to compress it upon the inclosed parts and cause a sufficient flow of material to not only give desired tapering form to the inclosing sleeve, as indicated in Figs. 1 and 2, but positive engagement of the inclosed material therewith by entrance into the one or more wall recesses or apertures 17, 17ª, so as to prevent the possibility of any relative movement of the united parts. The resulting structure is not only neat, simple and inexpensive, but avoids impairment in strength incident to any heat-treatment of the materials used and provides a strongly reinforced connection.

What I claim is:

1. A spectacle temple comprising a temple shaft, a separately formed temple pivot-piece having an angularly arranged shank portion and offset in substantial alinement with said shaft, and a straight offset-engaging sleeve inclosing said shank and shaft and united therewith by jointly swaging the combined parts.

2. A spectacle temple comprising a temple shaft, a separately formed temple pivot-piece having a shank portion arranged in alinement with said shaft, and a sleeve inclosing said shank and shaft and united therewith by jointly swaging the combined parts; said sleeve being provided with a radial aperture into which the shaft material is flowed by the swaging action.

3. A spectacle temple comprising a temple shaft, a separately formed temple pivot-piece having a bent shank portion and offset arranged in substantial alinement with said shaft, and a bent-up sheet-metal sleeve with offset-engaging recess inclosing said shank and shaft and united therewith by jointly swaging the combined parts.

4. A spectacle temple comprising a temple shaft, a separately formed temple-pivot-piece having a shank portion and offset arranged in alinement with said shaft, and a sleeve formed of apertured and notched sheet-metal inclosing said shaft and shank and having aperture and notch engagement therewith respectively.

5. A spectacle temple comprising a temple shaft, a separately formed temple pivot-piece having a shank portion and offset arranged in alinement with said shaft, and a peripherally apertured and end-notched sleeve inclosing said shaft and shank and having aperture and notch engagement therewith respectively.

6. A spectacle temple comprising a temple shaft, a separately formed temple pivot-piece having a shank portion arranged in alinement with said shaft and forming an offsetted junction with the pivot-end portion, and a connecting sleeve for said shaft and shank having a transversely slotted end abuttingly engaging said offsetted junction.

In testimony whereof I affix my signature.

HARRY F. SHINDEL.

Copies of this patent may be obtained for five cents each, by addressing the "Commissioner of Patents, Washington, D. C."